(12) United States Patent
Fricke et al.

(10) Patent No.: US 10,906,507 B2
(45) Date of Patent: Feb. 2, 2021

(54) DEFENSE OF A RELAY STATION ATTACK

(71) Applicant: VOLKSWAGEN AKTIENGESELLSCHAFT, Wolfsburg (DE)

(72) Inventors: Christoph Fricke, Braunschweig (DE); Andreas Thiele, Wolfsburg (DE); Dominique Nemetschek, Velpke (DE)

(73) Assignee: VOLKSWAGEN AKTIENGESELLSCHAFT

( * ) Notice: Subject to any disclaimer, the term of this patent is extended or adjusted under 35 U.S.C. 154(b) by 0 days.

(21) Appl. No.: 16/411,545

(22) Filed: May 14, 2019

(65) Prior Publication Data

US 2019/0351870 A1    Nov. 21, 2019

(30) Foreign Application Priority Data

May 17, 2018   (DE) .................. 10 2018 207 683

(51) Int. Cl.
*B60R 25/20*    (2013.01)
*B60R 25/24*    (2013.01)
*G07C 9/00*     (2020.01)

(52) U.S. Cl.
CPC ........ *B60R 25/2072* (2013.01); *B60R 25/209* (2013.01); *B60R 25/245* (2013.01); *G07C 9/00309* (2013.01); *G07C 2009/00555* (2013.01)

(58) Field of Classification Search
None
See application file for complete search history.

(56) References Cited

U.S. PATENT DOCUMENTS

| | | | |
|---|---|---|---|
| 9,646,443 B2* | 5/2017 | Hamada | G07C 9/00309 |
| 9,892,293 B1 | 2/2018 | Wade et al. | |
| 10,501,052 B2 | 12/2019 | Schindler et al. | |
| 2012/0154114 A1* | 6/2012 | Kawamura | B60R 25/2072 340/5.63 |
| 2016/0267734 A1 | 9/2016 | Hamada et al. | |

FOREIGN PATENT DOCUMENTS

| | | |
|---|---|---|
| DE | 102005039562 A1 | 3/2007 |
| DE | 102006007961 A1 | 8/2007 |
| DE | 102011088917 A1 | 6/2013 |

(Continued)

OTHER PUBLICATIONS

Office Action for Korean Patent Application No. 10-2019-0055505; dated Jun. 23, 2020.

*Primary Examiner* — Daniell L Negron
(74) *Attorney, Agent, or Firm* — Barnes & Thornburg LLP

(57) ABSTRACT

The performance of an action for a transportation vehicle, wherein a relay attack is prevented. In response to a transmission of a first radio signal at a first frequency, on the one hand, a second radio signal at a second frequency is received from an ID transponder authorized for the transportation vehicle and, on the other hand, a further radio signal at the first frequency is received. The action is performed for the transportation vehicle only in response to the second radio signal originating from an ID transponder authorized for the transportation vehicle and only in response to the signal strength of the further radio signal lying below a predefined signal strength threshold.

16 Claims, 1 Drawing Sheet

(56) References Cited

FOREIGN PATENT DOCUMENTS

| | | |
|---|---|---|
| DE | 102014107186 A1 | 11/2015 |
| DE | 102016208122 A1 | 7/2017 |
| DE | 102017201960 A1 | 8/2018 |
| JP | 2017506756 A | 3/2017 |
| JP | 2018066207 A | 4/2018 |
| WO | 2017162315 A1 | 9/2017 |
| WO | 2017220260 A1 | 12/2017 |

\* cited by examiner

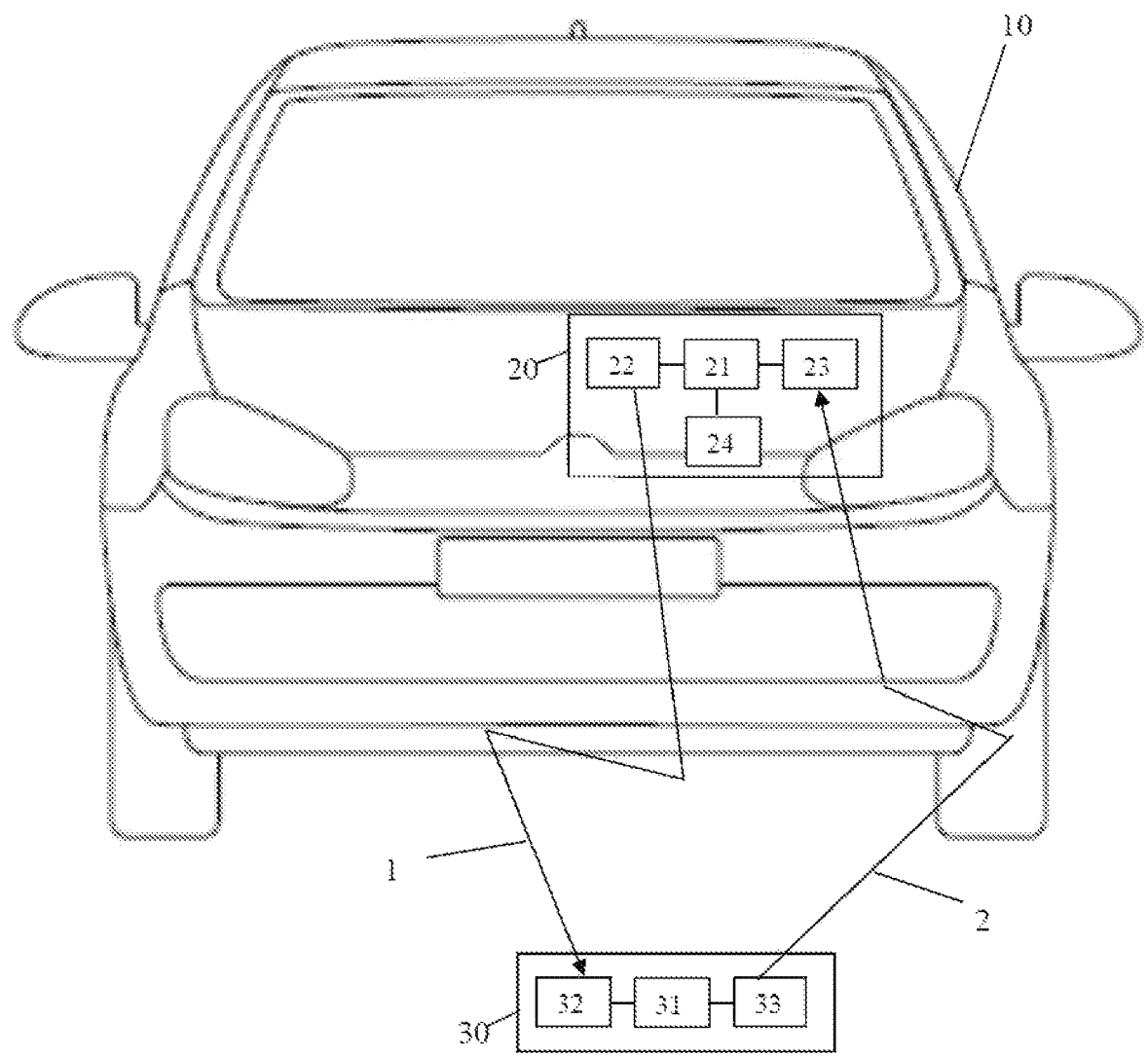

__DEFENSE OF A RELAY STATION ATTACK__

PRIORITY CLAIM

This patent application claims priority to German Patent Application No. 10 2018 207 683.9, filed 17 May 2018, the disclosure of which is incorporated herein by reference in its entirety.

SUMMARY

Illustrative embodiments relate to the prevention of a relay attack, which is also known as a "Relay Station Attack" (RSA) and with which a transportation vehicle with a keyless entry system and/or a keyless go system can be unlocked and started without permission.

BRIEF DESCRIPTION OF THE DRAWINGS

Disclosed embodiments are described in detail below with reference to the single FIGURE, in which.

FIG. 1 shows a transportation vehicle together with an ID transponder authorized for this transportation vehicle.

DETAILED DESCRIPTION

In a relay station attack, the transportation vehicle is unlocked or opened even if the key authorized for the transportation vehicle is located outside the range of the transportation vehicle. To do this, radio signals are extended or amplified via a relay station so that, in a manner of speaking, both the key and the transportation vehicle assume that they are located in each case within the respective range of one another. Transportation vehicles can thus be stolen with a relay station attack of this type.

These relay station attacks exist in different options. In the simplest option, the signal field strength of the LF (low-frequency) signal transmitted by the transportation vehicle is amplified in the manner of a megaphone. This simple option attempts to exploit the fact that the range of the LF signal transmitted by the transportation vehicle is normally less than the range of the UHF signal transmitted by the radio key or ID transponder. If the transportation vehicle is located within the range of the UHF signal transmitted by the radio key, the transportation vehicle can be stolen as a result. A situation of this type frequently occurs in residential areas.

Disclosed embodiments prevent a relay station attack of this type.

Disclosed embodiments provide a method for performing an action for a transportation vehicle and by a system.

According to the disclosed embodiments, a method is provided for performing an action for a transportation vehicle (for example, unlocking the transportation vehicle or starting an engine of the transportation vehicle). This disclosed method comprises the following operations:

Transmitting a first radio signal at a first frequency. This first radio signal can, for example, be transmitted automatically by the transportation vehicle if the transportation vehicle detects that a person is approaching the transportation vehicle or if a specific command is issued to the transportation vehicle (e.g., if a button is pressed to start the engine). The first radio signal is an LF (low-frequency) signal. The LF range has, for example, a frequency lower than 300 kHz. The LF signal has, for example, a frequency of 134 kHz, 125 kHz or 21 kHz.

Depending on or in response to the transmission of the first radio signal, a second radio signal at a second radio frequency (different from the first radio frequency) is received if an ID transponder authorized for the transportation vehicle has received the first radio signal. This second radio signal is normally a UHF (ultra-high frequency) signal. The UHF range has, for example, a frequency higher than 200 MHz and lower than 3 GHz. The UHF signal has, for example, a frequency of 434 MHz (868 MHz) in Europe and 315 MHz in North America. The second radio signal may also be a BLUETOOTH® signal, a Wi-Fi signal, a UWB (ultra-wideband) signal or any other radio signal. The second radio signal is transmitted by the ID transponder authorized for the transportation vehicle if or as soon as this ID transponder or radio key receives the first radio signal. The ID transponder is normally designed in such a way that it transmits the second radio signal only if the ID transponder recognizes on the basis of the received first radio signal that the first radio signal was transmitted by the transportation vehicle for which the ID transponder is authorized.

The action is performed for the transportation vehicle depending on the received second radio signal. In this operation, a check is carried out by a corresponding evaluation of the second radio signal, to determine whether the ID transponder transmitting the second radio signal is authorized to perform the action for the transportation vehicle. The action is performed only if it is recognized on the basis of the evaluation of the second radio signal that the ID transponder is authorized to perform the action for the transportation vehicle.

A further radio signal at the first frequency is also received in response to or depending on the transmission of the first radio signal. In the normal case (without a relay station attack), this further radio signal corresponds, in a manner of speaking, to the (reflected) first radio signal which was transmitted by the transportation vehicle itself.

In a manner of speaking as a further condition (along with the authorization of the ID transponder described above), the action is performed for the transportation vehicle only if a signal strength of the further radio signal lies below a predefined signal strength threshold. Otherwise (i.e., if the signal strength of the further radio signal is equal to or greater than the predefined signal strength threshold), the response of the ID transponder is, in a manner of speaking, ignored.

An amplification of the first radio signal (e.g., LF signal) transmitted by the transportation vehicle is recognized by the method described above and, in this case, the associated action is not performed for the transportation vehicle. In the event of a relay station attack in which the first radio signal (e.g., LF signal) transmitted by the transportation vehicle is amplified, the disclosed method captures the further radio signal (i.e., the superimposed amplified first radio signal) with an increased signal strength which lies above the predefined signal strength threshold. However, as soon as the further radio signal is captured with a signal strength which lies above the predefined signal strength threshold, the action is not performed for the transportation vehicle, as a result of which the relay station attack is prevented.

In at least one disclosed embodiment, the first radio signal is transmitted with a predefined signal strength. The predefined signal strength threshold is adapted to this predefined signal strength of the first radio signal. The higher the signal strength with which the first radio signal is transmitted, the higher the predefined signal strength threshold also is.

Through the comparison of the signal strength of the received further radio signal with the signal strength threshold, a check is carried out to determine whether the received further radio signal is the (e.g., reflected) first radio signal which the transportation vehicle itself has transmitted, or whether the received further radio signal is the first signal, e.g., amplified in the event of a relay station attack. It is therefore beneficial if the signal strength threshold is adapted according to the signal strength with which the first radio signal is transmitted by the transportation vehicle.

According to the disclosed embodiments, a system is also provided which comprises a controller and at least one antenna and which, through an interaction between the controller and the at least one antenna, is designed to transmit a first radio signal at a first frequency to receive a second radio signal at a second frequency in response to the transmission of this first radio signal and to perform an action of the transportation vehicle depending on the received second radio signal. In addition, the disclosed system, through an interaction between the controller and the at least one antenna, is designed to receive a further radio signal at the first frequency depending on the transmission of the first radio signal and to perform the action only if a signal strength of the further radio signal lies below a predefined signal strength threshold.

The benefits of the disclosed system essentially correspond to the benefits of the disclosed method, which are set out in detail above, so that no repetition is required here.

The at least one antenna comprises at least one first antenna, at least one second antenna and at least one further antenna. The at least one first antenna (in particular, a first LF antenna) is designed to transmit the first radio signal. The at least one second antenna is designed to receive the second radio signal so that the second radio signal is received using the controller depending on the transmission of the first radio signal by the at least one second antenna. The controller is designed to perform the action depending on the received second radio signal. The at least one further antenna (in particular, one or more second LF antennas) is designed to receive the further radio signal so that the further radio signal is received using the controller depending on the transmission of the first signal with the at least one further antenna.

In at least one disclosed embodiment, the at least one first antenna comprises a plurality of first antennas. These first antennas are designed to transmit and to receive radio signals at the first frequency. The first antennas furthermore comprise the at least one further antenna.

According to at least one cost-effective embodiment, the transportation vehicle can have, for example, a plurality of LF antennas. The first radio signal is normally transmitted only via one of these LF antennas. The further radio signal can be received accordingly via the remaining LF antennas. No additional antenna is required in this disclosed embodiment to receive the further radio signal.

However, it is also possible for the at least one first antenna and the at least one further antenna to be different, i.e., to have no overlap (i.e., no first antenna is also one of the further antennas).

This disclosed embodiment enables the at least one further antenna to be an antenna optimized to receive the further radio signal. The at least one further antenna can comprise, for example, one or more 3D LF coils which are fitted to the transportation vehicle. Using a 3D LF coil of this type, the further radio signal can be captured more effectively than with the at least one first antenna which is normally a 1D LF antenna which can transmit and receive only one-dimensionally. If these (receiving) 1D LF antennas are unfavorably aligned, a radio signal which is transmitted by another of these (transmitting) 1D LF antennas as a first radio signal can only be received inadequately by the (receiving) 1D LF antennas as a further radio signal. In other words, a 3D LF coil enables an independent injection of the LF signals, which is not possible with the normal LF antennas.

According to the disclosed embodiments, a transportation vehicle is also provided which comprises a system according to the disclosure.

The disclosed embodiments are suitable for use in transportation vehicles with a keyless entry system and/or with a keyless go system. However, the disclosed embodiments can also be used in principle in ships, aircraft and track-bound or rail-guided transportation vehicles.

The single FIGURE shows a transportation vehicle 10 which comprises a system 20, together with an ID transponder 30 which is authorized for the illustrated transportation vehicle 10.

Along with a controller 21, the system 20 comprises an LF antenna 22, a UHF antenna 23 and a further LF antenna 24. Along with a controller 31, the ID transponder or radio key 30 comprises an LF antenna 32 and a UHF antenna 33.

The description below indicates how the performance of an action for the transportation vehicle (normally an unlocking or a starting of the engine of the transportation vehicle) takes place without a relay station attack.

If a person approaches the transportation vehicle 10, this being detected, for example, by an (optical) sensor of the transportation vehicle 10 or by the actuation of a door handle of the transportation vehicle 10, the system 20 transmits an LF radio signal 1 using the controller 21 and the LF antenna 22. The LF radio signal 1 is normally transmitted by an LF antenna which is located close to the location where the person approaches the transportation vehicle, so that an ID transponder authorized for the transportation vehicle 10 is searched for close to this location.

As soon as the ID transponder 30 authorized for the transportation vehicle 10 captures the LF radio signal 1 with its LF antenna 32, this LF radio signal 1 is evaluated using the controller 31. If the ID transponder 30 recognizes that the LF radio signal 1 belongs to the transportation vehicle 10 assigned to it, the ID transponder 30 transmits a UHF radio signal 2 using the controller and its UHF antenna 33. This UHF radio signal 2 comprises a corresponding code by which the transportation vehicle 10 can recognize that the ID transponder 30 is authorized for the transportation vehicle 10.

With its UHF antenna 23, the system 20 captures the UHF signal 2 transmitted automatically by the ID transponder 30 in response to the received LF radio signal 1. An evaluation of this UHF radio signal 2 by the controller 21 indicates that the ID transponder 30 is authorized for the transportation vehicle 10. The controller 21 therefore initiates a corresponding action for the transportation vehicle 10 which, in the case of a detected approach of a person (as previously described), is an unlocking of the transportation vehicle 10.

In the event of a relay attack or relay station attack, a thief, for example, approaches the transportation vehicle 10. In the same way as described above, the transportation vehicle 10 detects the approach of the thief and transmits the LF radio signal 1. This LF radio signal 1 is received and output in amplified form with an apparatus which the thief, for example, carries with him. The range of the LF radio signal 1 is thereby increased.

If an ID transponder 30 authorized for the transportation vehicle 10 is now located within the increased range of the amplified LF radio signal 1, this ID transponder 30 receives the amplified LF radio signal 1 and for its part transmits a UHF signal 2 (in the same way as described above). The relay attack exploits the fact that the range of the UHF radio signal 2 transmitted by an ID transponder 30 is significantly greater than the range of the LF radio signal transmitted by the transportation vehicle 10 by its LF antenna 22. Without amplification of this LF radio signal 1, a UHF signal 2 transmitted in response to this LF radio signal 1 would be transmitted only if the corresponding ID transponder 30 were located in the immediate vicinity of the corresponding transportation vehicle 10. Due to the amplification of the LF radio signal 1 during the relay attack, ID transponders 30 which are located at a distance from the transportation vehicle which is significantly greater than the range of the LF radio signal 1 transmitted by the transportation vehicle 10 are also prompted in turn to transmit a UHF radio signal 2. As a result, the thief can instigate an unlocking of the transportation vehicle 10 even if the authorized ID transponder 30 is not in his possession, but, for example, is located in a building close to the transportation vehicle 10.

The further LF antenna 24 exists to prevent a relay attack of this type. The system 20 is designed so that it captures LF radio signals with its further LF antenna 24 in response to a transmission of the LF radio signal 1 (e.g., during a predefined time interval which begins at the time of the transmission of the LF radio signal). In the event of a relay attack as described above, this further LF antenna 24 would capture an LF radio signal whose signal strength is greater than in the case where the LF radio signal 1 transmitted by the system 20 is not amplified. The signal strength of an LF radio signal which is captured with the further LF antenna 24 is compared with a signal strength threshold. The action for the transportation vehicle 10 (for example, the unlocking of the transportation vehicle 10) is performed only if, on the one hand, the UHF signal 2 captured by the system 20 originates from an authorized ID transponder 30 and, on the other hand, the signal strength of the LF radio signal captured with the further LF antenna 24 lies below the signal strength threshold. Through this comparison of the signal strength with the signal strength threshold, it is beneficially recognized whether the LF signal 1 transmitted by the system 20 itself has been amplified (particularly in the event of a relay attack). In other words, on the basis of this comparison of the signal strength with the signal strength threshold, it is recognized whether a relay attack is or is not taking place, so that the action for the transportation vehicle is carried out only if no relay attack has been detected through this comparison.

REFERENCE NUMBER LIST

1 LF radio signal
2 UHF radio signal
10 Transportation vehicle
20 System
21 Controller
22, 24 LF antenna
23 UHF antenna
30 ID transponder
31 Controller
32 LF antenna
33 UHF antenna

The invention claimed is:

1. A system for a transportation vehicle, the system comprising:
a controller; and
at least one first antenna of the transportation vehicle, at least one second antenna of the transportation vehicle, and at least one further antenna of the transportation vehicle,
wherein the system, through interaction with the controller and the at least one first antenna, the at least one second antenna, and the at least one further antenna:
transmits a first radio signal at a first frequency;
receives a second radio signal at a second frequency in response to the transmission of the first radio signal;
receives a further radio signal at the first frequency based on the transmission of the first radio signal; and
performs an action of the transportation vehicle based on the received second radio signal only in response to a signal strength of the further radio signal lying below a predefined signal strength threshold,
wherein:
the at least one first antenna transmits the first radio signal,
the at least one second antenna receives the second radio signal, and
the at least one further antenna receives the further radio signal.

2. The system of claim 1, wherein no antenna of the at least one further antennas is one of the at least one first antennas.

3. The system of claim 1, wherein the first radio signal is transmitted based on an approach of a person to the transportation vehicle.

4. The system of claim 1, wherein the first radio signal is transmitted with a predefined signal strength, and the predefined signal strength threshold is selected based on predefined the signal strength.

5. The system of claim 4, wherein the further radio signal is the first radio signal, a reflection of the first radio signal, or an amplified relay of the first radio signal, wherein the predefined signal strength is less than the predefined signal strength threshold, wherein the reflection has a signal strength less than the predefined signal strength threshold, and wherein the relay has a signal strength greater than the predefined signal strength threshold.

6. The system of claim 1, wherein an ID transponder for the transportation vehicle receives the first radio signal and transmits the second radio signal.

7. The system of claim 6, wherein the first radio signal is an LF signal and/or the second radio signal is a UHF signal.

8. The system of claim 1, wherein the action is an unlocking of the transportation vehicle and/or a starting of an engine of the transportation vehicle.

9. A transportation vehicle including the system of claim 1.

10. A method for performing an action for a transportation vehicle, the method comprising:
transmitting with a first antenna of the transportation vehicle a first radio signal at a first frequency;
receiving with a second antenna of the transportation vehicle a second radio signal at a second frequency in response to the transmission of the first radio signal;
receiving with a further antenna of the transportation vehicle a further radio signal at the first frequency based on the transmission of the first radio signal; and
performing the action based on the received second radio signal only in response to a signal strength of the further radio signal lying below a predefined signal strength threshold.

11. The method of claim 10, wherein the first radio signal is transmitted based on an approach of a person to the transportation vehicle.

12. The method of claim 10, wherein the first radio signal is transmitted with a predefined signal strength, and the predefined signal strength threshold is selected based on the predefined signal strength.

13. The method of claim 12, wherein the further radio signal is the first radio signal, a reflection of the first radio signal, or an amplified relay of the first radio signal, wherein the predefined signal strength is less than the predefined signal strength threshold, wherein the reflection has a signal strength less than the predefined signal strength threshold, and wherein the relay has a signal strength greater than the predefined signal strength threshold.

14. The method of claim 10, wherein the action is an unlocking of the transportation vehicle and/or a starting of an engine of the transportation vehicle.

15. The method of claim 10, wherein an ID transponder for the transportation vehicle receives the first radio signal and transmits the second radio signal.

16. The method of claim 15, wherein the first radio signal is an LF signal and/or the second radio signal is a UHF signal.

* * * * *